United States Patent
Vanasse

Patent Number: 5,162,872
Date of Patent: Nov. 10, 1992

[54] TILT/SHEAR IMMUNE TUNABLE FABRY-PEROT INTERFEROMETER

[75] Inventor: George A. Vanasse, Chelmsford, Mass.

[73] Assignee: The United States of America as represented the secretary of the Air Force, Washington, D.C.

[21] Appl. No.: 724,619

[22] Filed: Jul. 2, 1991

[51] Int. Cl.$^5$ .............................................. G01B 9/02
[52] U.S. Cl. ..................................... 356/352; 356/345
[58] Field of Search ........................ 356/352, 360, 345

[56] References Cited

U.S. PATENT DOCUMENTS

| | | | |
|---|---|---|---|
| 4,225,236 | 9/1980 | Sandercock | 356/346 |
| 4,243,323 | 1/1981 | Breckinridge | 356/345 |
| 4,466,699 | 8/1984 | Droessler et al. | 350/166 |
| 4,542,988 | 9/1985 | Kraushaar | 356/352 |
| 4,547,801 | 10/1985 | Haisma et al. | 358/111 |
| 4,559,224 | 12/1985 | Raaf | 424/54 |
| 4,733,561 | 3/1988 | Gilby | 73/579 |
| 4,768,182 | 8/1988 | Hatfield | 369/109 |
| 4,825,262 | 4/1989 | Mallinson | 356/352 |
| 4,859,060 | 8/1989 | Katagiri et al. | 356/352 |
| 4,895,428 | 1/1990 | Nelson et al. | 350/103 |
| 4,938,596 | 7/1990 | Gauthier et al. | 356/360 |

*Primary Examiner*—Samuel A. Turner
*Assistant Examiner*—Richard E. Kurtz, II
*Attorney, Agent, or Firm*—William G. Auton; Donald J. Singer

[57] ABSTRACT

A Fabry-Perot interferometer that is shear and tilt immune as well as being tunable. The basic design consists of a spherical semi-reflecting mirror and a planar array of retro-directive mirrors (referred to as phase or pseudo-phase conjugators). The focal point of the spherical mirror is located between the retro-array or phase conjugate mirror and the spherical mirror. In this configuration the Fabry-Perot is immune to tilting and shear displacement of its optical elements as well as being tunable to change the optical path difference between interfering beams.

6 Claims, 1 Drawing Sheet

TILT/SHEAR IMMUNE TUNABLE FABRY-PEROT INTERFEROMETER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical systems, and more specifically the invention pertains to a Fabry-Perot interferometer that is shear and tilt immune as well as being tunable.

Optical interferometers are devices in which interference of light is used. Some applications of this phenomenon in which interferometers are used as a tool include metrology and spectroscopy. These uses include precise measurements of wavelength, the measurement of very small distances and thicknesses by using known wavelengths, the detailed study of the hyperfine structure of spectrum lines, the precise determination of refractive indices, and, in astronomy, the measurement of binary-star separations and the diameters of stars. Optical interferometers are based on both two-beam interference and multiple-beam interference, as discussed briefly below.

The interference of waves is the process whereby two or more waves of the same frequency or wavelength combine to form a wave whose amplitude is the sum of the amplitudes of the interfering waves. The interfering waves can be electromagnetic, acoustic, or water waves, or in fact any periodic disturbance.

The most striking feature of interference is the effect of adding two waves in which the trough of one wave coincides with the peak of another. If the two waves are of equal amplitude, they can cancel each other out so that the resulting amplitude is zero. This is perhaps most dramatic in sound waves; it is possible to generate acoustic waves to arrive at a person's ear so as to cancel out noise that is disturbing him. In optics, this cancellation can occur for particular wavelengths in a situation where white light is a source. The resulting light will appear colored. This gives rise to the irridescent colors of beetles' wings and mother-of-pearl, where the substances involved are actually colorless or transparent.

A conventional Fabry-Perot interferometer promotes multiple interference using: focusing optics, two glass plates, two partially transmitting silver layers, an image plane, and a frame upon which the other elements are fixed. The focusing optics often consist of two lens elements: one lens in front of the glass plates, and one lens behind the glass plates. The first lens is a collimating lens to collimate the light entering the interferometer. The glass plates are fixed parallel to each other on the frame and have the partially transmitting silver layers fixed on their interior sides so that the incoming wave is multiply reflected between the two surfaces. The second lens will focus the outgoing wave onto a focal plane.

The conventional Fabry-Perot interferometer functions well as long as the frame holds the optical elements in alignment. If the glass plates and partially transmitting silver layers become tilted with respect to each other, the interferometer will lose its ability to function.

The task of providing a Fabry-Perot interferometer which is immune to the effects of tilt and shear movement is alleviated, to some extent, by the systems disclosed in the following U.S. Patents, the disclosures of which are incorporated herein by reference:

U.S. Pat. No. 4,895,428 issued to Nelson et al;
U.S. Pat. No. 4,466,699 issued to Droesler et al;
U.S. Pat. No. 4,559,224 issued to Monchalin;
U.S. Pat. No. 4,733,561 issued to Gilby;
U.S. Pat. No. 4,768,182 issued to Hatfield;
U.S. Pat. No. 4,859,060 issued to Katagiri et al;
U.S. Pat. No. 4,825,262 issued to Mallinson;
U.S. Pat. No. 4,547,801 issued to Haisma et al;
U.S. Pat. No. 4,542,988 issued to Kraushaar;
U.S. Pat. No. 4,243,323 issued to Breckinridge; and
U.S. Pat. No. 4,225,236 issued to Sandercock.

The patents identified above relate to variable interferometric devices. In particular, the Katagiri et al patent describes a Fabry-Perot interferometer comprising a pair of reflecting substances facing each other with a space in between. A means for deforming at least one of the reflecting substances is provided to change the interferometric characteristics of the device. The means for deforming the reflecting substance may be an electrostatic force or a magnetic field.

The Mallison patent relates to a Fabry-Perot interferometer in which one of the reflective surfaces is affixed on a diaphragm mounted by a hinge assembly to a support. This approach allows the position of the diaphragm to be changed, resulting in the size of the gap to be changed. A single crystal may be used for the support, diaphragm, and hinge assembly.

The Haisma et al patent describes a tunable Fabry-Perot interferometer comprising two parallel facing mirrors where the supports for the mirrors consist of bundles of optical fibers. The mirrors are situated at a very small distance from each other and extend at right angles to the axis of the interferometer. Such a tunable Fabry-Perot interferometer can be used effectively in an x-ray display device.

The Kraushaar patent relates to a reflective Fabry-Perot interferometer where the conventional pair of spaced parallel mirrors have a predetermined angle with respect to an incident light beam. Third and fourth mirrors are each disposed at a different end of the first and second mirrors at a second predetermined angle with respect to a line parallel to the incident light beam. With this approach, end losses in the two parallel conventional mirrors are reduced, and the light beam emanating from the two conventional mirrors is reinforced.

The Breckinridge patent describes an interferometer which is tilt compensated and facilitates adjustment of the path lengths of split light beams. The interferometer comprises a pair of plate-like elements with a dielectric coating and an oil film between them that forms a beamsplitter interface. A pair of reflector surfaces are affixed at the ends of the plates. A pair of retroreflectors are positioned so that each split beam component is directed by a retroreflector onto one of the reflector surfaces and is then returned to the beamsplitter interface. The oil film which is less than twenty micro-inches thick, passes approximately equal amounts of all wavelengths longer than the film thickness, and enables one plate to shift relative to the other.

The Sandercock patent relates to a vernier tandem Fabry-Perot interferometer comprising a first pair of plane mirrors forming an interferometer, and a second pair of plane mirrors forming a second interferometer. One mirror of each pair is mounted on a common movable support so that when the support is moved, the spacing between one pair of mirrors remains in the same ratio to the spacing between the other pair of mirrors as the original ratio between these spacings. The system thus continues to exhibit a single pass band at frequencies of interest corresponding to different spacings between mirror pairs. Mirror parallelism is maintained by a deformable parallelogram, and a transducer provides mirror motions.

All of the above-cited references (except Nelson) describe the technology associated with Fabry-Perot interferometer applications. Unfortunately, the optical elements of such systems remain subject to potential disruption from any tilt and/or shear displacement. The present invention is intended to provide a Fabry-Perot configuration immune to the effects of tilt and shear displacement with the use of phase conjugate or psuedo-phase conjugate mirror technology.

SUMMARY OF THE INVENTION

The present invention includes a Fabry-Perot interferometer system that is immune to the effects of tilting and shear displacement of the optical elements. One embodiment of the invention uses a phase conjugate or pseudo-phase conjugate mirror which is placed in propinquity with a partially transparent spherical mirror. In operation, optical waves are transmitted into a cavity by said semi-transparent spherical mirror to produce multi beam interference.

The pseudo-phase conjugate or phase conjugate mirror has the property of reflecting optical waves back along their angle of incidence. In operation, the pseudo-phase or phase conjugate mirror is placed so that it intercepts the optical waves after they pass through the partially reflecting spherical mirror. The properties of the phase or pseudo-phase conjugate mirror enable it to reflect the waves back upon themselves regardless of any tilt or shear displacement it experiences with respect to the semi-transparent spherical mirror. A more detailed description of the optical properties of phase conjugate mirrors is described in U.S. Pat. No. 4,529,273 issued to Cronin-Golomb, the disclosure of which is incorporated by reference. Pseudo-phase conjugate mirrors are self-contained optical elements consisting of arrays of small (150 microns) cube corners which are produced commercially by companies such as the 3M Corporation as described in the Nelson et al reference cited above.

The present invention is also a method of producing interference between multiple waves due to multiple passes through the Fabry-Perot. One method involves the steps of: focusing the two waves through a partially transmitting spherical mirror and onto the focal point of the spherical mirror; and reflecting the two waves back through the focal point with the pseudo-phase or phase conjugate mirror then back to the spherical mirror and onto the pseudo phase or phase conjugate mirror and back out the spherical mirror. Multiple beams are thus produced by multiple passes between the two elements to the Fabry-Perot. It is an object of the present invention to provide a tunable interferometer with optical elements that are immune to disruption by tilt and shear displacement.

It is another object of the present invention to provide a Fabry-Perot interferometer design which has a spherical mirror and a pseudo-phase or phase conjugate mirror to optically combine multiple waves.

These together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a tilt/shear-immune spherical Fabry-Perot interferometer which is tunable for use in high-resolution spectroscopy.

Figure 1:
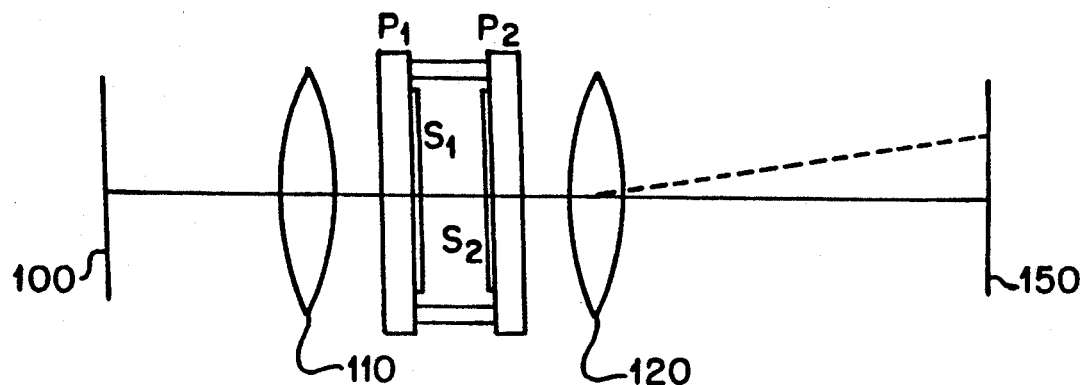
FIG. 1 is an illustration of a prior art Fabry-Perot interferometer.

The reader's attention is now directed towards FIG. 1 which is an illustration of a prior art Fabry-Perot interferometer. The system of FIG. 1 includes: an illumination source 100, a collimating lens 110, two glass plates $P_1$ and $P_2$, two partially transmitting silver layers $S_1$ and $S_2$, a focusing lens 120, and a focal plane 150.

The operation of the system of FIG. 1 was described above. The purpose of FIG. 1 is to demonstrate the susceptability of such prior art systems to tilt. More specifically, if either of the glass plates $P_1$ and $P_2$, with their silver layers, $S_1$ and $S_2$ are tilted, such movement can jeopardize the ability of the system to produce an interference pattern on the focal plane 150.

Figure 2:
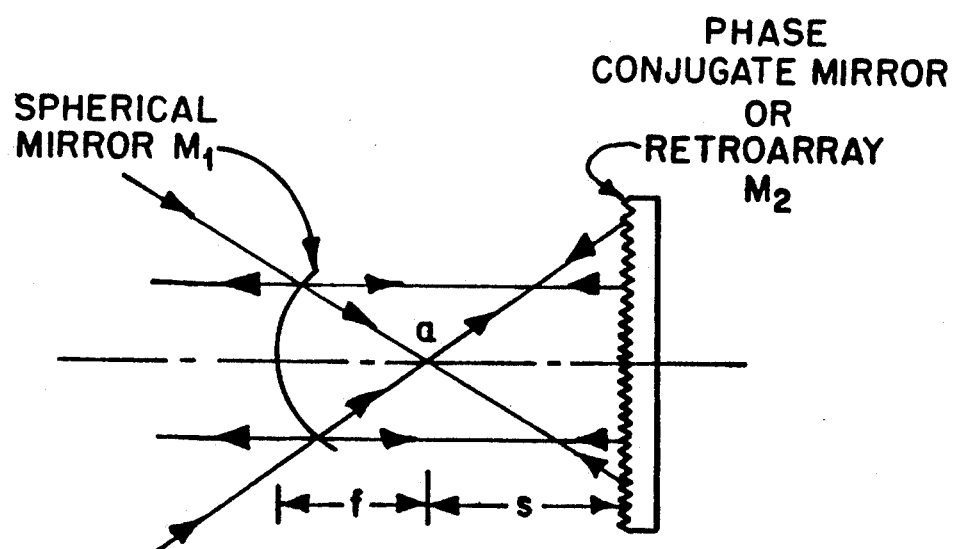
FIG. 2 is an illustration of the preferred embodiment of the present invention.

The reader's attention is now directed towards FIG. 2, which is an illustration of the Fabry-Perot interferometer system of the present invention. The system of FIG. 2 involves a partially transparent spherical input mirror $M_1$ with either a phase or pseudo-phase conjugator $M_2$.

As shown in FIG. 2, point "a" in the figure is the focal point of the high-reflectivity mirror $M_1$. The property of the pseudo-phase conjugate mirror $M_2$ is such that the efficiency of the system of FIG. 2 does not depend on "s" the distance from "a" to $M_2$. As a consequence of this property the FP resolving power, or its transmission as a function of wavelength can be varied by displacing mirror $M_2$ without any loss of efficiency. That is, the system of FIG. 2 is wavelength tunable as well as being immune to tilt and shear.

Pseudo-phase conjugate mirrors are commercially available, and are produced by companies such as the 3M Company of St. Paul, Minn., the Reflexite Corporation of New Britain, Connecticut and Precision Lapping Inc. Pseudo-phase and phase conjugate mirrors given resolving power would be less compact.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An interferometer for producing multiple beam interference among waves while retaining an ability to function when tilted and experiencing shear displacement with respect to said waves, said interferometer comprising:

a means for directing waves to produce multiple-beam interference among the waves, wherein said directing means comprises a semi-transparent spherical mirror which transmits said waves, some of which pass through a focal point, and which receives and reflects said waves back through said focal point; and a means for reflecting waves back along their angle of incidence, said reflecting means being fixed in propinquity with said directing means such that the reflecting means receives and reflects said waves back upon themselves regardless of any tilt and shear displacement between the two means.

2. An interferometer for producing multiple beam interference among waves while retaining an ability to function when tilted and experiencing shear displacement with respect to said waves, aid interferometer comprising:

a means for directing waves to produce multiple-beam interference among the waves, and wherein said directing means comprises a semi-transparent spherical mirror which transmits said waves, some of which pass through said focal point, and which receives and reflects a waves from said reflecting means back through said focal point; and a means for reflecting waves back along their angle of incidence, said reflecting means being fixed in propinquity with said directing means such that the reflecting means receives and reflects said waves back upon themselves regardless of any tilt and shear displacement between the two means, wherein said reflecting means comprises a pseudo-phase conjugate mirror element which reflects optical waves back along their angle of incidence.

3. An interferometer for producing multiple beam interference among waves while retaining an ability to function when tilted and experiencing shear displacement with respect to said waves, said interferometer comprising:

a means for directing waves to produce multiple-beam interference among the waves, and wherein said directing means comprises a semi-transparent spherical mirror which transmits said waves, some of which pass through a focal point, and which receives and reflects said waves from said reflecting means back through said focal point; and a means for reflecting waves back along their angle of incidence, said reflecting means being fixed in propinquity with said directing means such that the reflecting means receives and reflects said waves back upon themselves regardless of any tilt and shear displacement between the two means, and wherein said reflecting means comprises a phase conjugate mirror element which reflects optical waves back along their angle of incidence.

4. A process for producing multiple-beam interference among waves, said process comprising the steps of:

transmitting said waves so that some of said waves pass through a focal point and continue on; and wherein said transmitting step is accomplished by placing a partially-transparent spherical mirror in a position such that it intercepts said waves and directs them, said partially-transparent spherical mirror also redirecting said waves back to a focal point so that the waves produce said multiple-beam interference; and intercepting said waves and reflecting them back along their angle of incidence so that they return to produce said multi beam interference.

5. A process, as defined in claim 4, wherein said intercepting step is performed by placing a pseudo-phase conjugate mirror in propinquity with said partially-transparent spherical mirror so that it intercepts said waves after they pass through said focal point, said pseudo-phase conjugate mirror reflecting said waves back along their angle of incidence so that the waves produce said multiple beam interference.

6. A process, as defined in claim 4, wherein said intercepting step is performed by placing a phase conjugate mirror in propinquity with said partially-transparent spherical mirror so that it intercepts said waves after they pass through said focal point, said phase conjugate mirror reflecting said waves back along their angle of incidence so that the waves produce said multiple beam interference.

* * * * *